United States Patent [19]

Mummolo

[11] Patent Number: 5,967,191
[45] Date of Patent: Oct. 19, 1999

[54] METHOD FOR SERVICING A LIVE PIPELINE

[75] Inventor: Felix P. Mummolo, Spring City, Pa.

[73] Assignee: Smart Technology Inc., Pottstown, Pa.

[21] Appl. No.: 09/008,987

[22] Filed: Jan. 20, 1998

[51] Int. Cl.$^6$ .............................. F16L 55/18; F16K 43/00
[52] U.S. Cl. ................................ 138/97; 138/94; 138/89; 137/15; 137/315; 137/318
[58] Field of Search .................. 138/97, 93, 89, 138/94; 137/15, 315, 317, 318

[56] References Cited

U.S. PATENT DOCUMENTS

| | | |
|---|---|---|
| 2,080,271 | 5/1937 | Hirst . |
| 3,867,964 | 2/1975 | Gardner .............................. 137/318 X |
| 4,153,067 | 5/1979 | Ray . |
| 4,198,081 | 4/1980 | Harrison et al. . |
| 4,226,448 | 10/1980 | Broyles . |
| 4,345,783 | 8/1982 | Bergstrand . |
| 4,351,349 | 9/1982 | Minotti ................................ 138/97 X |
| 4,355,656 | 10/1982 | Smith .................................. 138/97 X |
| 4,393,564 | 7/1983 | Martin ................................. 138/89 X |
| 4,508,130 | 4/1985 | Studer et al. ....................... 137/318 X |
| 4,527,586 | 7/1985 | Yano et al. ............................. 137/318 |
| 4,552,170 | 11/1985 | Margrave . |
| 4,869,281 | 9/1989 | Rockower et al. ..................... 137/315 |
| 4,883,085 | 11/1989 | Weller et al. . |
| 5,052,431 | 10/1991 | Jiles ....................................... 137/318 |
| 5,152,311 | 10/1992 | McCreary .............................. 138/89 X |
| 5,224,516 | 7/1993 | McGovern et al. ................... 138/89 X |
| 5,316,037 | 5/1994 | Martin ................................... 138/97 X |
| 5,400,814 | 3/1995 | Tigerholm . |
| 5,524,661 | 6/1996 | Tigerholm . |
| 5,577,528 | 11/1996 | Saha et al. ............................. 137/315 |
| 5,611,365 | 3/1997 | Maichel . |

*Primary Examiner*—Patrick Brinson
*Attorney, Agent, or Firm*—Ference & Associates

[57] ABSTRACT

A process for servicing a live pipeline does not require the preexistence of isolation valves or access components or the use of special enclosures. No special components remain in the serviced pipeline. The invention is particularly useful for servicing hospital medical gas distribution pipelines or other pipelines having restrictions on components, connections, and contamination. The process comprises steps of isolating a pipeline section, severing the pipeline in the isolated section, plugging the pipeline upstream of the severed open end using a fluid-tight seal, removing a pipeline section downstream of the fluid-tight seal, connecting a first replacement section having a first valve to the pipeline proximate to the fluid-tight seal, moving the fluid-tight seal into the replacement section and downstream of the first valve, closing the first valve, repeating the procedure on the downstream side so as to connect a second replacement section and close a second valve located therein, interconnecting the first and second replacement sections, and then opening the first and second valves to permit fluid flow through the first and second replacement sections.

12 Claims, 7 Drawing Sheets

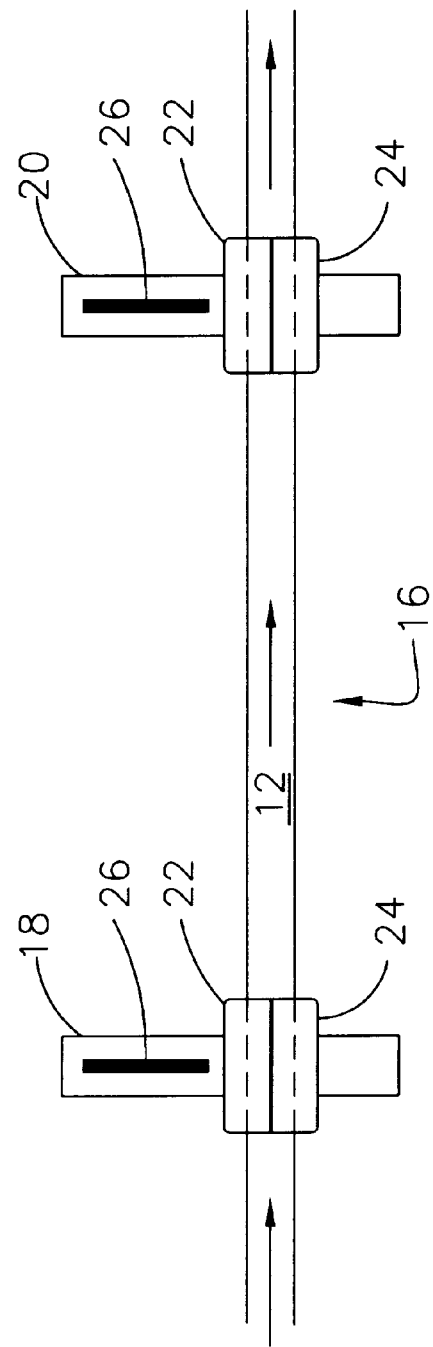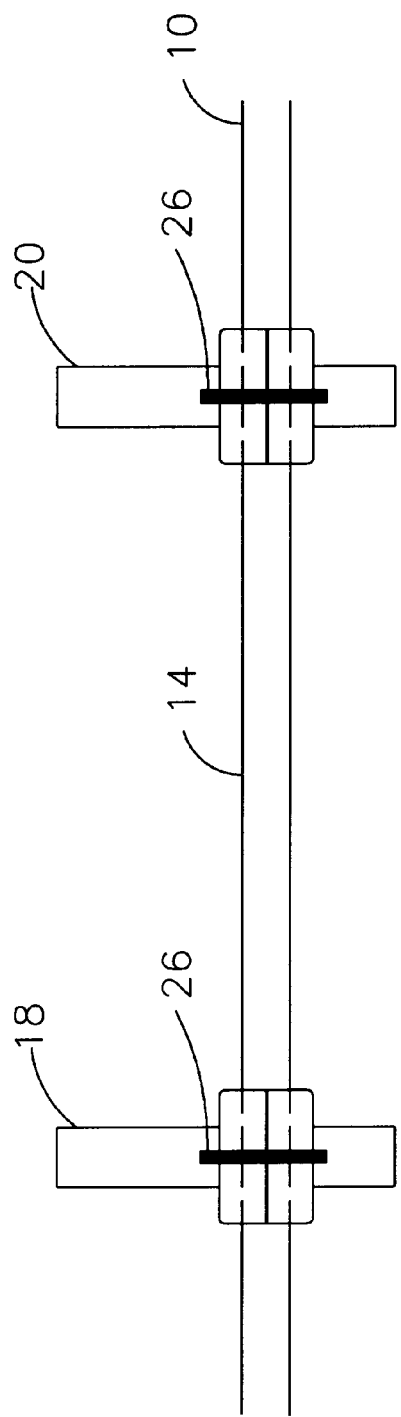

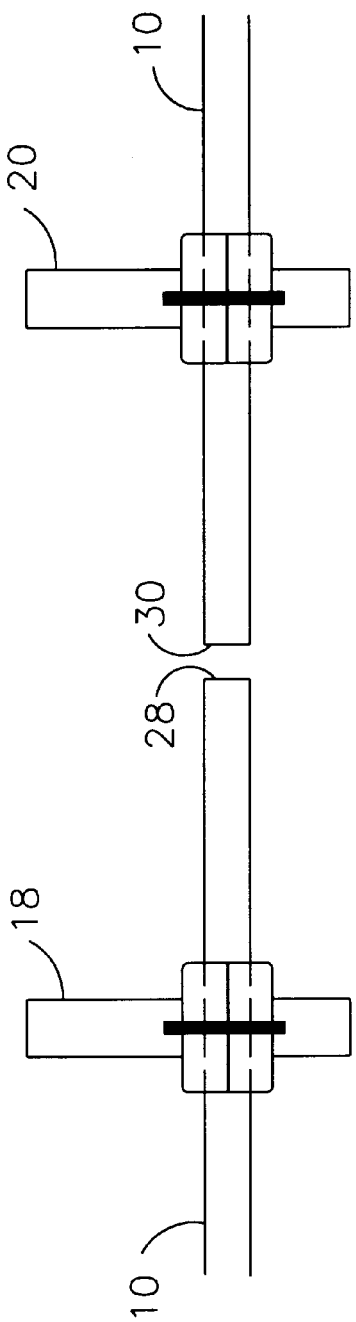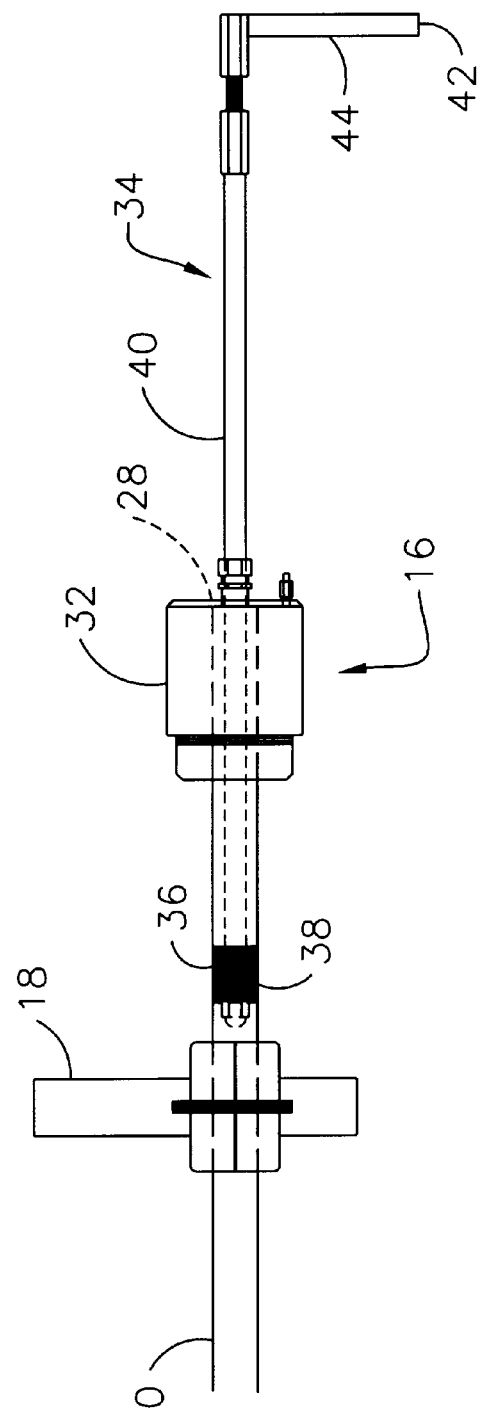

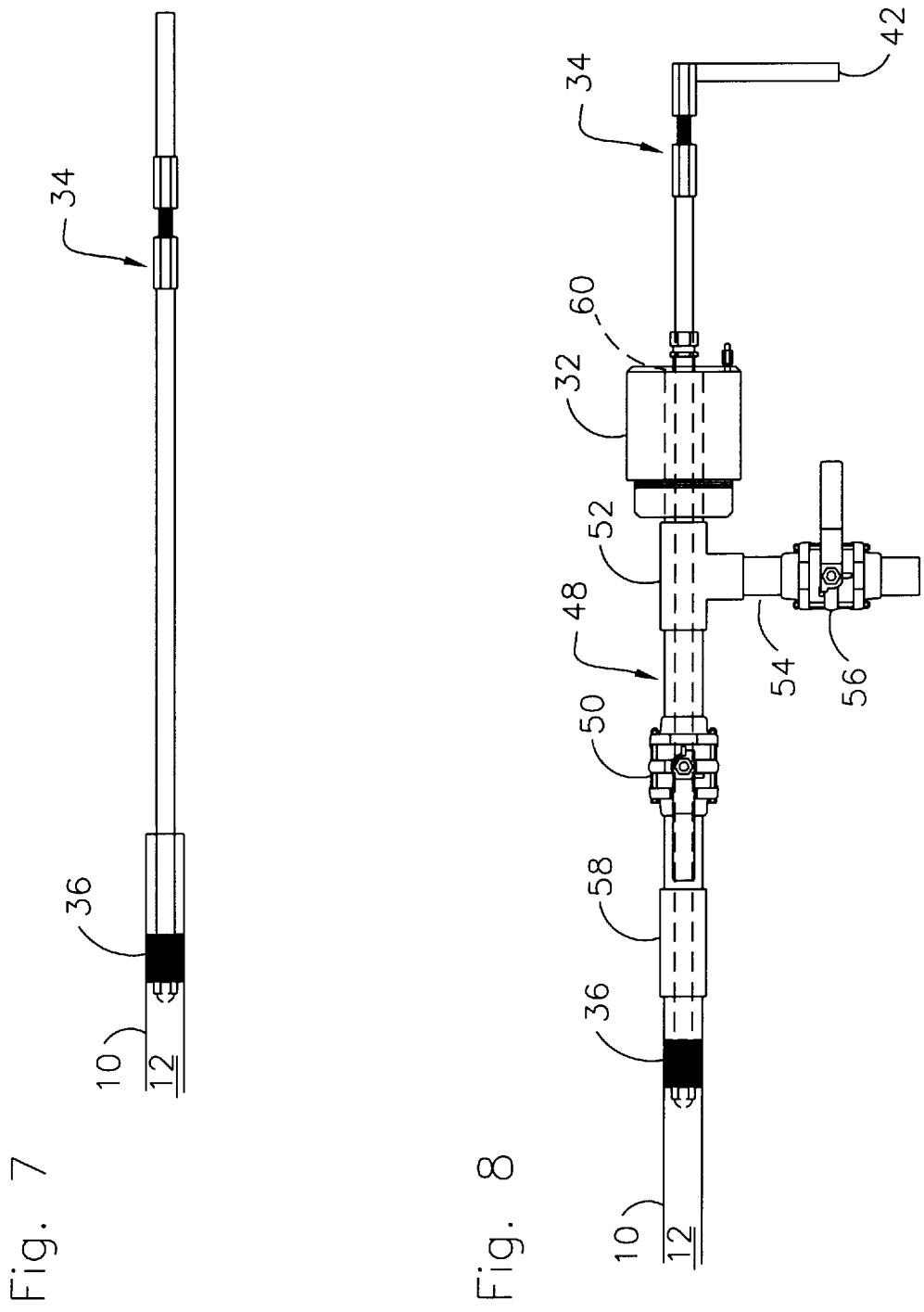

METHOD FOR SERVICING A LIVE PIPELINE

BACKGROUND OF THE INVENTION

1. Field of the Invention

The present invention relates to a method for servicing a live pipeline. More particularly, the present invention relates to a method which is suitable for servicing a live pipeline which minimizes or eliminates service interruption and contamination.

2. Description of the Prior Art

A pipeline is live when it is carrying a fluid such as gas, liquid, slurry, or vacuum. Servicing live pipelines to make repairs or to install new components or branch sections or other extension sections presents difficulties due to the presence of the fluid being carried by the pipeline. Not only does the escape of the fluid itself cause many problems, but the fluid also interferes with the installation of the replacement sections or components and can affect the integrity of the connections made during the servicing activity.

The difficulties are particularly acute when such a live pipeline being serviced is part of a system which is sensitive to contamination, e.g., a medical gas distribution system in a hospital. Such pipelines are subject to rigorous codes to insure the cleanliness and the integrity of the distribution system and of the delivered fluid. For example, under the National Fire Protection Association (NFPA) Code 99-1996, which is applicable to hospitals, pipelines carrying such medical gases as oxygen, air, nitrogen, and nitrous oxide, as well as vacuum, may only be made of copper and, with few exceptions, all connections must be made by soldering or brazing or by memory-metal couplings having temperature and pressure ratings not less than that of a brazed joint.

A variety of schemes and special devices have been devised in the past for servicing live pipelines, but there has not yet been developed a quick and simple method having general applicability which results in a pipeline meeting the high integrity and cleanliness required for medical gas distribution piping. Some existing methods, such as those described in Yano et al., U.S. Pat. No. 4,527,586, issued Jul. 9, 1985 or Saha et al., U.S. Pat. No. 5,577,528, issued Nov. 26, 1996 require the temporary installation of work enclosures sealed around the pipeline. Others, such as those described in Gardner, U.S. Pat. No. 3,867,964, issued Feb. 25, 1975 or Minotti, U.S. Pat. No. 4,351,349, issued Sep. 28, 1982 or Smith, U.S. Pat. No. 4,355,656, issued Oct. 26, 1982 or Jiles, U.S. Pat. No. 5,052,431, issued Oct. 1, 1991 require affixing special fittings which remain attached to the pipeline after the servicing operation has been completed. Others, such as those described in Ray, U.S. Pat. No. 3,773,067, issued Nov. 20, 1973 or Rockower et al., U.S. Pat. No. 4,869,281, issued Sep. 26, 1989 require the preexistence in the pipeline of a plugged T-connection or other component through which the interior of the pipeline can be accessed. Others, such as that described in Struder et al., U.S. Pat. No. 4,508,130, issued Apr. 2, 1985 require the preexistence in the pipeline of a shutoff valve upstream of the location that is to be serviced. Some, such as that described in the above mentioned Minotti result in the pipeline having components and connections which would not meet the above mentioned NFPA code.

SUMMARY OF THE INVENTION

The method described herein overcomes the deficiencies of the existing art by providing a quick and simple method which has general applicability for the servicing of live pipelines without relying on preexisting isolation valves. The method provides a high integrity pipeline after the servicing has been completed. The method allows for the installation into the pipeline of standard components and standard connectors which meet the specifications and regulations for the original pipeline, including such applicable codes as NFPA Code 99-1996. Furthermore, no special fittings are left attached to the pipeline as is the case with some prior art methods. Also, unlike prior art methods which use special work enclosures sealed around the pipeline, the method imposes no limitations as to the size or the geometry of the components that can be added or the length of pipeline section which can be serviced at one time. Moreover, the method does not depend on plugged T-connectors or other access components being present in the pipeline prior to the application of the method.

A method for servicing a live pipeline comprises the following steps. Initially, a section of the pipeline is isolated from fluid communication with the rest of the pipeline. Next, the pipeline is severed in the isolated section therein creating first and second open ends. The pipeline is then plugged with a first fluid-tight seal upstream of the first open end. Plugging eliminates fluid communication between the portions of the pipeline on either side of first fluid-tight seal. A section of the pipeline between the first fluid-tight seal and the first open end is then removed. A first replacement line section is then connected to the pipeline proximate to the first fluid-tight seal. The first replacement line section comprises a first valve. The first fluid-tight seal is then moved to a location within the first replacement line section downstream of the first valve. The first valve is then closed to prevent fluid communication between the portions of the line upstream of the first valve and those portions downstream of the first valve. The pipeline is then plugged with a second fluid-tight seal downstream of the second open end. A section of the pipeline between the second fluid-tight seal and the second open end is then removed. Then, a second replacement line section is connected to the pipeline proximate to the second fluid-tight seal. The second replacement line section comprises a second valve. The second fluid-tight seal is then moved to a location within the second replacement section upstream of the second valve. The second valve is then closed to prevent fluid communication between the portions of the line upstream of the second valve and those portions downstream of the second valve. Then, the first and second replacement line sections are interconnected to permit fluid communication therebetween. Finally, the first and second valves are open so as to permit fluid flow through the interconnected first and second replacement sections from the rest of the pipeline.

The first and second fluid-tight seals are removed prior to the step of interconnecting the first and second sections. The first fluid-tight seal is removed after the first valve has been closed and before the step of interconnecting the first and second sections has been accomplished. Likewise, the second fluid-tight seal is removed after the second valve has been closed and before the step of interconnecting the first and second sections has been accomplished. In some applications of the method, the same fluid-tight seal may be used first as the first fluid-tight seal and then as the second fluid-tight seal.

Although in the above description of the method the steps were described as being first performed on the upstream portion of the pipeline, it is immaterial whether the upstream or downstream portion is addressed first. It is also possible in some applications for the two portions to be addressed simultaneously.

Some versions of the method may include steps additional to those just recited. For example, after the first and second replacement sections have been interconnected, the additional step of purging the first and second replacement line sections may be conducted prior to opening the second valve so as to avoid contaminating the downstream pipeline fluid with any air or other fluid or fluidizable contaminants that may have entered the section of the pipeline being serviced. As another example, the interruption of fluid delivery downstream of the service section, i.e., the section that is being serviced, may be avoided or diminished by the additional step of installing, prior to cutting off the fluid flow through the service section, a bypass line around the service section by connecting an upstream outlet to a downstream outlet using a suitably sized and prepared bypass line. However, due to the quickness with which a live pipeline can be serviced by the method, the need for installing a bypass around the service section is less than it is with more time consuming prior art methods.

Other features and advantages inherent in the subject matter claimed and disclosed will become apparent to those skilled in the art from the following detailed description presently preferred embodiments thereof and to the appended drawings.

BRIEF DESCRIPTION OF THE DRAWINGS

The criticality of the features and the merits of the present invention will be better understood by reference to the attached drawings. It is to be understood, however, that the drawings are designed for the purpose of illustration only and not as a definition of the limits of the invention.

FIG. 1 through FIG. 12 schematically show the service section of a pipeline, partially in cross-section, during sequential stages of servicing a pipeline.

FIG. 1 shows the service section after the installation of the first and second temporary valves.

FIG. 2. shows the service section after the closing of the first and second temporary valves.

FIG. 3 shows the service section after the service section has been severed between the first and second temporary valves.

FIG. 4 shows the upstream side of the service section after the attachment of the reducing gasket to the first open end.

FIG. 5 shows the upstream side of the service section after the stopper rod sealing end has been slid through the first temporary valve and made to seal the pipeline upstream of the stopper rod sealing end from fluid communication with the pipeline downstream of the stopper rod sealing end.

FIG. 6 shows the upstream side of the service section after the pipeline has been severed between the stopper rod sealing end and the first temporary valve.

FIG. 7 shows the upstream side of the service section after the severed section has been removed.

FIG. 8 shows the upstream side of the service section after the first replacement section has been connected to the pipeline.

FIG. 9 shows the upstream side of the service section after the stopper rod sealing end has been slid through the first permanently affixed valve and that valve has been closed and the reducing gasket has been removed.

FIG. 10 shows the upstream side of the service section after the stopper rod has been removed.

FIG. 11 shows the service section after the second replacement end has been connected to the pipeline and the stopper rod has been removed.

FIG. 12 shows the service section after the first and second replacement sections have been interconnected.

DESCRIPTION OF PREFERRED EMBODIMENTS

Figure 5:
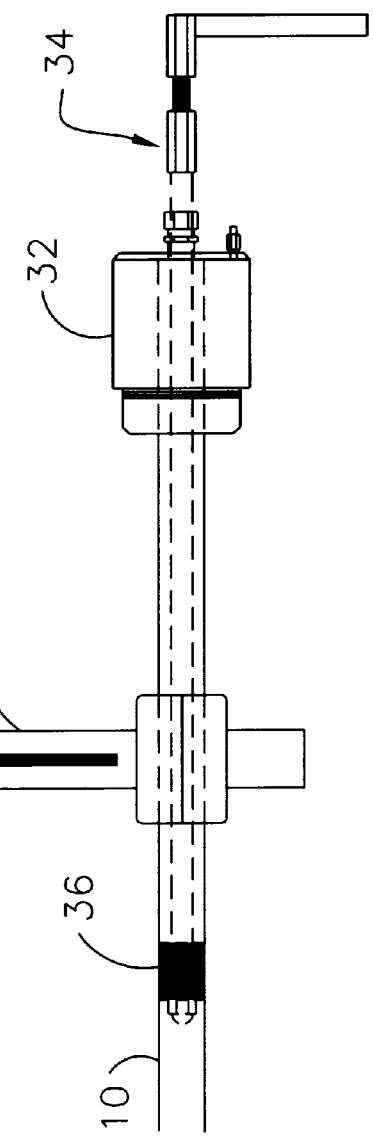

A description of a preferred embodiment of the present invention will now be given with reference to the sequential schematic drawings of FIG. 1 through FIG. 12. As shown in FIG. 1, pipeline 10 contains a pipeline fluid 12 which flows from left to right through pipeline 10. Pipeline 10 may be of any material known to those skilled in the art including, but not limited to, copper, galvanized steel, and plastic. Likewise, the pipeline fluid 12 may be any fluid, such as a gas, liquid, or vacuum, that is compatible with pipeline 10. For convenience of description, the section of the pipeline to be serviced will be referred to as the service section 16.

A first embodiment of a method for servicing live pipelines in accordance with the present invention comprises the following steps. Initially, as part of the step of isolating a section of the pipeline, first and second temporary valves 18, 20 are installed in the pipeline 10, one in the upstream side of the service section 16 and the other in the downstream side of the service section 16. As shown, first temporary valve 18 is upstream of the service section 16 and second temporary valve 20 is downstream side of the service section 16. However, except as noted otherwise, it makes no difference whether the steps related to the upstream side of the service section 16 are done before or after those done to the downstream side and the two sequences are considered equivalent.

First and second temporary valves 18, 20 are described here as temporary because they will be removed from the pipeline 10 during later steps. Suitable valves that can be installed in a live pipeline for use as first and second temporary valves 18, 20 exist in the art as one skilled in the art will recognize. One type of valve which is particularly well suited for use with the practice of this embodiment in medical gas distribution line applications is described in Martin, U.S. Pat. No. 5,316,037, issued May 31, 1994, the teachings of which are incorporated herein by reference. Commercial versions of the valve described in Martin which are suitable for use with the method are available under the trademark ADD-A-VALVE® from Jomar International, Ltd., Madison Heights, Mich. The valve described in Martin is a split-body valve having an upper portion 22 and a lower portion 24. In using the valve described in Martin as described herein, these valve portions are sealingly mounted on pipeline 10 and sealingly attached to each other. The valve described in Martin is particularly well suited for use when applied to medical gas distribution pipelines because this valve includes a means for perforating the walls of the pipeline and a means for collecting the chips and the coupons that are formed as the sidewalls of the pipeline are perforated during the installation of the valve. These features minimize the contamination of the pipeline and of the fluid carried by the pipeline.

Next first and second temporary valves 18, 20 are closed isolating the isolated section 14 of service section 16 between these two valves from fluid communication with the remainder of the pipeline 10. This step is illustrated by the change in position of valving means 26 from the open position in the first and second temporary valves 18, 20 shown in FIG. 1, to the closed position in FIG. 2. Equivalently, this step may also be carried out by closing the first temporary valve 18 after its installation and then closing the second temporary valve 20 after its installation.

As depicted in FIG. 3, the pipeline 10 is then severed in the isolated section 14 between first and second temporary valves 18, 20 thereby creating a first open end 28 on the pipeline 10 proximate to the first temporary valve 18 and a second open end 30 on the pipeline 10 proximate to the second temporary valve 20. The step of severing the pipeline 10 may be accomplished by any means known to one skilled in the art, including, but not limited to, sawing, shearing, or through the use of rotatable pipe cutters. Precautions recognized as necessary by one skilled in the art are employed to deal with the fluid which escapes from the isolated section 14 during the severing step.

The step of severing the pipeline 10 may be accomplished by making a single cut through the pipeline 10 or by making multiple cuts and removing a portion or portions of isolation section 14 After the severing has been completed, usually work will be done on one side of the service section and then on the other, though in some applications it may be desirable to service both sides simultaneously. As one skilled in the art will recognize, inasmuch as the two sides of the service section were originally collinear, it will be necessary to deflect one side or the other during some steps of the servicing to avoid interference with the other side. The number of steps during which such deflection is needed can be reduced by removing a large enough portion of isolated section 14 during the severing step to facilitate the manipulation of tools and replacement sections.

A reducing gasket 32 is then sealingly attached to the first open end 28 of the pipeline 10 in the isolated section 14. This step is illustrated in FIG. 4 which, like FIG. 5–10, shows only the upstream side portion of the service section 16. The reducing gasket 32 may be held in place by its own gripping force or by fasteners which would be recognized as suitable by one skilled in the art.

Removably, sealingly, and axially disposed within the reducing gasket 32 is a stopper rod 34. The reducing gasket 32 provides a fluid-tight seal between the pipeline 10 and the stopper rod 34 so as to prevent escape of pipeline fluid 12 around the stopper rod 34. Stopper rod 34 has a sealing end 36 which is insertable into the pipeline 10, a shaft 40, and a free end 42 which remains outside of the pipeline 10. The free end 42 optionally includes a handle 44 which is capable of swinging from a position with the stopper rod shaft 40 into a position that is at a right angle to the shaft 40 so as to facilitate manipulation of the stopper rod 34. The stopper rod sealing end 36 is capable of sealing the portion of the pipeline upstream of the stopper rod sealing end from fluid communication with the portion of the pipeline 10 downstream of the stopper rod sealing end 36. The stopper rod sealing end 36 includes an elastomer 38 that is capable of making a fluid-tight seal with the pipeline 10. The elastomer 38 of the stopper rod sealing end 36 may be any elastomeric material such as, but not limited to, silicon rubber, latex rubber, viton, urethane, buna-N, neoprene, or other elastomers which one skilled in the art would recognize as being a suitable gasket material in this application. When a fluid-tight seal is made between the stopper rod sealing end 36 and the pipeline 10, the friction between the stopper rod sealing end 36 and the pipeline 10 may be used to hold the stopper rod 34 in place.

A stopper rod which is suitable for use with some applications of embodiments of the present invention is available from the Bernelle Company, Los Vegas, Nev., under the trademark JET SWET. The JET SWET stopper rod has a radially expandable, silicon rubber elastomeric sealing end and a mechanism for expanding and contracting the sealing end. By operating the mechanism to expand the sealing end of the JET SWET stopper rod, the sealing end 36 can be made to create a fluid-tight seal within the pipeline 10. The JET SWET stopper rod is available in a variety of sizes and one skilled in the art would select the size most appropriate for a particular application.

Figure 13:
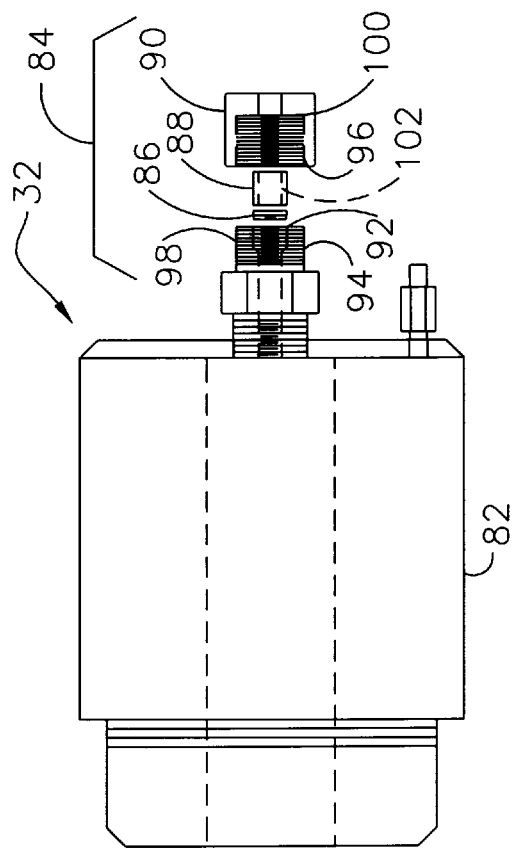
FIG. 13 is a partly exploded, partly cross-sectional side elevation view of a reducing gasket.

The reducing gasket 32 is a gasketing device which provides a fluid-tight seal between the pipeline 10 and the stopper rod shaft 40 while permitting the stopper rod sealing end 36 to be moved back and forth within the pipeline 10. An example of a device which is suitable for use as reducing gasket 32 is shown in FIG. 13. The reducing gasket 32 shown in FIG. 13 consists of a gland body 82 and a stopper rod seal assembly 84. The gland body 82 is described in Bergstrand, U.S. Pat. No. 4,345,783, issued Aug. 24, 1982, the teachings of which are incorporated herein by reference. Commercial versions of the gland body 82 suitable for use with the method are available from Fastest, St. Paul, Minn., under the product name of FE External Connector. The stopper rod seal assembly 84 consists of a seat 86, an elastomeric gasket 88, and a following nut 90. The seat 86 is an annular disc adapted to be seated within the nipple end recess 92 and may be of metal or plastic. The elastomeric gasket 88 is an annular gasket made of an elastomer such as, but not limited to, silicon rubber, latex rubber, viton, urethane, buna-N, neoprene, or other elastomers which one skilled in the art would recognize as being a suitable gasket material in this application. Elastomeric gasket 88 is partially disposed within nipple end recess 92. Follower nut 90 is threadably attached to nipple 94 by means of follower nut internal threads 96 and nipple external threads 98. As the follower nut 90 is advanced onto nipple 94, the gasket 88 becomes compressed between the seat 86 and the end face 100 of the follower nut 90 thus controllably compressing the internal annular surface 102 of gasket 88 against the stopper rod shaft 40 to create a fluid-tight seal therebetween.

Next, as illustrated in FIG. 5, the first temporary valve 18 is opened. The sealing end 36 of the stopper rod 34 is then slid through the first temporary valve 18 to a position upstream of first temporary valve 18. The stopper rod sealing end 36 is then made to seal the pipeline 10 upstream of the stopper rod sealing end 36 from fluid communication with the pipeline 10 downstream of the stopper rod sealing end 36.

Figure 6:
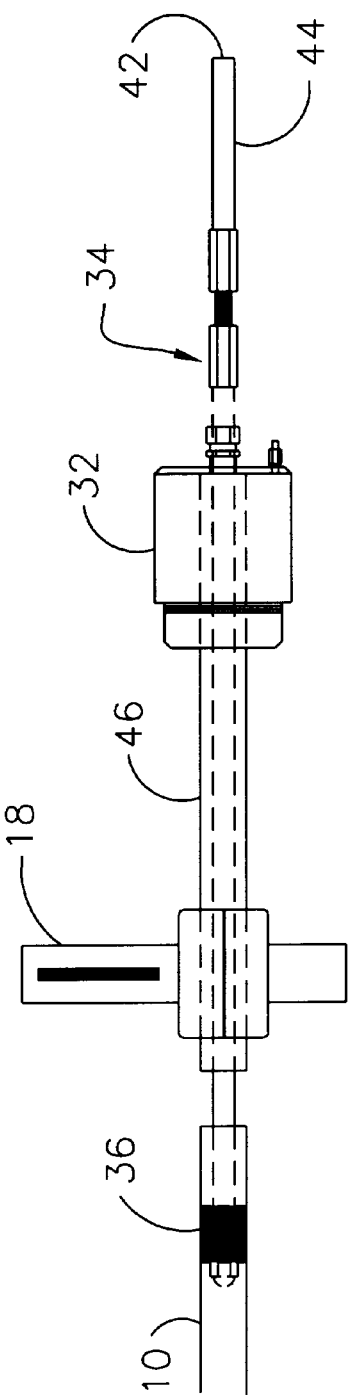

Referring now to FIG. 6, the pipeline 10 is then severed at a location between the stopper rod sealing end 36 and the first temporary valve 18. The step of severing the pipeline 10 may be accomplished by any means known to one skilled in the art, including, but not limited to, sawing, shearing, or through the use of rotatable pipe cutters. Precautions recognized as necessary by one skilled in the art may be employed to deal with any fluid that escapes during the severing step.

The severed section 46 intermediate the stopper rod sealing end and the first open end 28 of the service section 16 is then removed by sliding the severed section 46 over the stopper rod free end 42. When the stopper rod 42 includes optional handle 44, the handle 44 is positioned to be collinear with the remainder of the stopper rod 34 during this step. At the completion of this step, the stopper rod remains in the pipeline 10 as shown in FIG. 7.

Referring now to FIG. 8, a first replacement section 48 having a first permanently affixed valve 50 is provided. The first permanently affixed valve 50 is referred to as permanently affixed because this valve will remain attached to the pipeline 10 after the completion of the servicing of the pipeline 10. The first replacement section 48 may include additional components such as, but not limited to, tee connector 52 and transverse leg 54 and permanently affixed branch valve 56, so long the additional components are sealable so as to prevent fluid communication between the interior of the second replacement section and the surrounding atmosphere. A first connector 58 may be included as part of first replacement section 48 or may be provided separately. Preferably, first replacement 48 and first connector 58 are provided in compliance with the specifications applicable to the pipeline 10, including material, connection, and cleanliness specifications.

First replacement section 48 is then slid over the free end 42 of the stopper rod and then sealingly and permanently connected to the pipeline 10 proximate to the stopper rod sealing end 36 using first connector 58. Whenever first connector 58 is provided as a separate part from first replacement section 48, connector 58 is slid over stopper rod free end 42 prior to replacement section 48 and then first connector 58 is connected to both the pipeline 10 and to first replacement section 48. In either case, the connections made during this step may be made by any methods or combinations of methods which are known to those skilled in the art and which are compatible with the specifications for pipeline 10. For example, when the pipeline 10 is copper, the connections may be made by soldering or brazing or by providing first connector 58 as a memory-metal coupling and taking the steps necessary for making a connection with memory-metal couplings or by using other suitable connecting methods known to one skilled in the art. In embodiments wherein pipeline 10 is constructed of plastic, the connections may be made by gluing or by electrofusion or by using other suitable connecting methods known to one skilled in the art. Where appropriate in terms of materials and pipeline specifications, the connections may be made by threadably engaging first connector 58 with pipeline 10 or through the use of compression fittings.

The reducing gasket 32 may be removably and sealingly installed onto free end 60 of the first replacement section 48 either before or after the first replacement section 48 is attached to pipeline 10, so long as reducing gasket 32 is so installed and the stopper rod 34 is removably, sealingly, and axially disposed within the reducing gasket 32 prior to the commencement of the next step.

Figure 9:
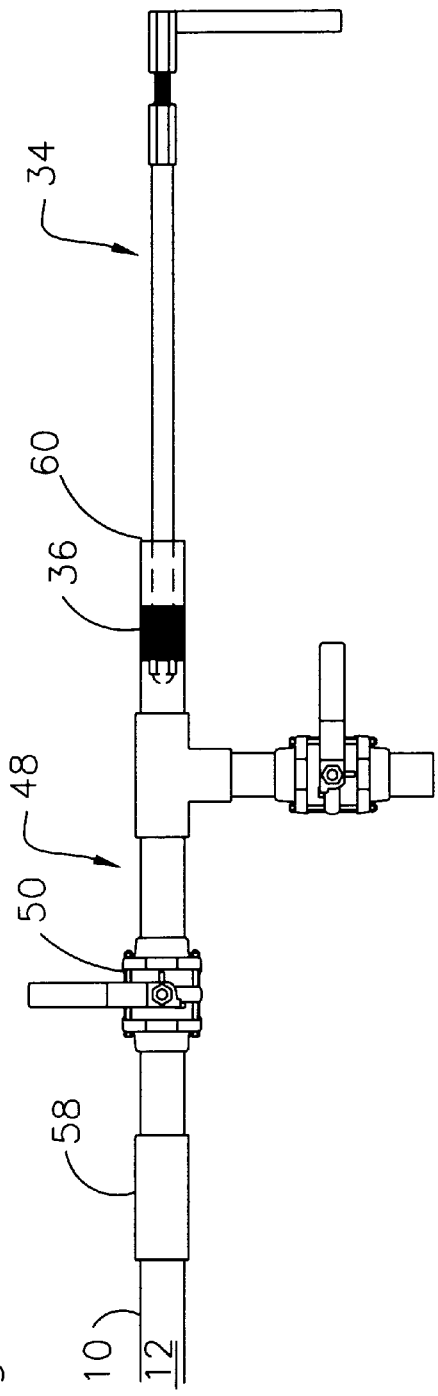
Figure 10:
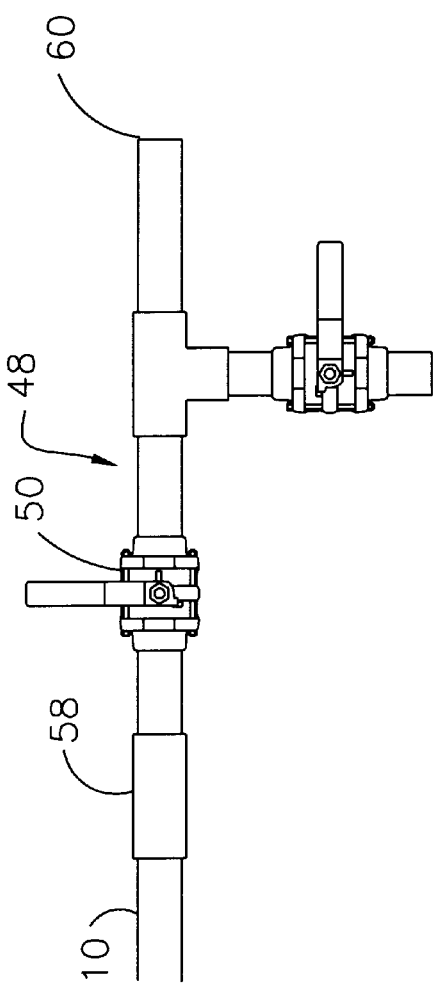

Referring now to FIG. 9, the stopper rod sealing end 36 is then slid through the first permanently affixed valve 50 to a position within first replacement section 48 downstream of the first permanently affixed valve 50. The first permanently affixed valve 50 is then closed and the reducing gasket 32 is then removed from the free end 60 of the first replacement section 48. The stopper rod 34 is then removed from first replacement section 48 as is shown in FIG. 10. Alternatively, the stopper rod 34 and the reducing gasket 32 may be simultaneously removed as a unit.

Figure 11:
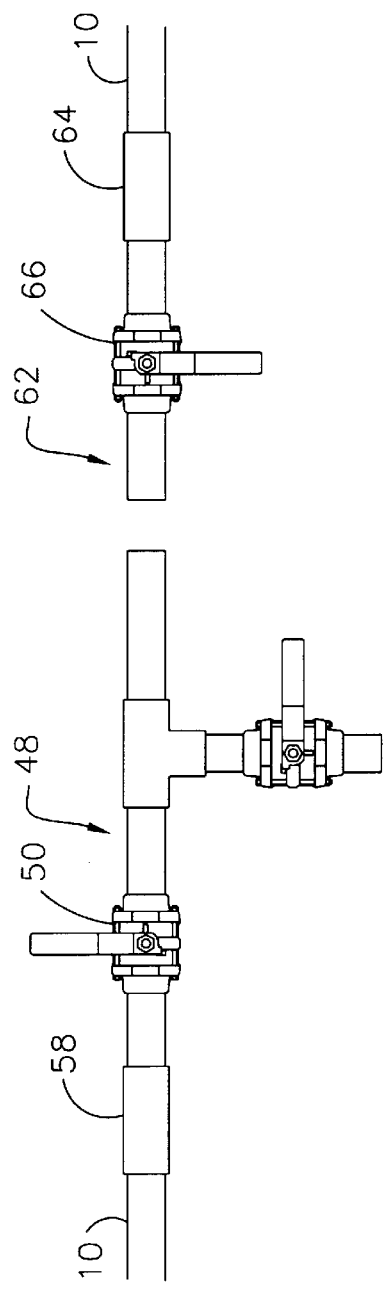

Next the steps just described for servicing the upstream side of the service section 16 are repeated for servicing the downstream side of the service section 16. FIG. 11 shows both the upstream and downstream sides of the service section 16 after these steps have been completed on the downstream side of the service section 16. As shown in FIG. 11, second replacement section 62 is connected to pipeline 10 with second connector 64 and contains second permanent valve 66. Just as was discussed above with regard to first replacement section 48, second replacement section 62 may contain additional components so long these components are sealable as to prevent fluid communication between the interior of the second replacement section and the surrounding atmosphere. Also, second connector 64 may be provided as part of second replacement section 62 or separately from that section.

Figure 12:
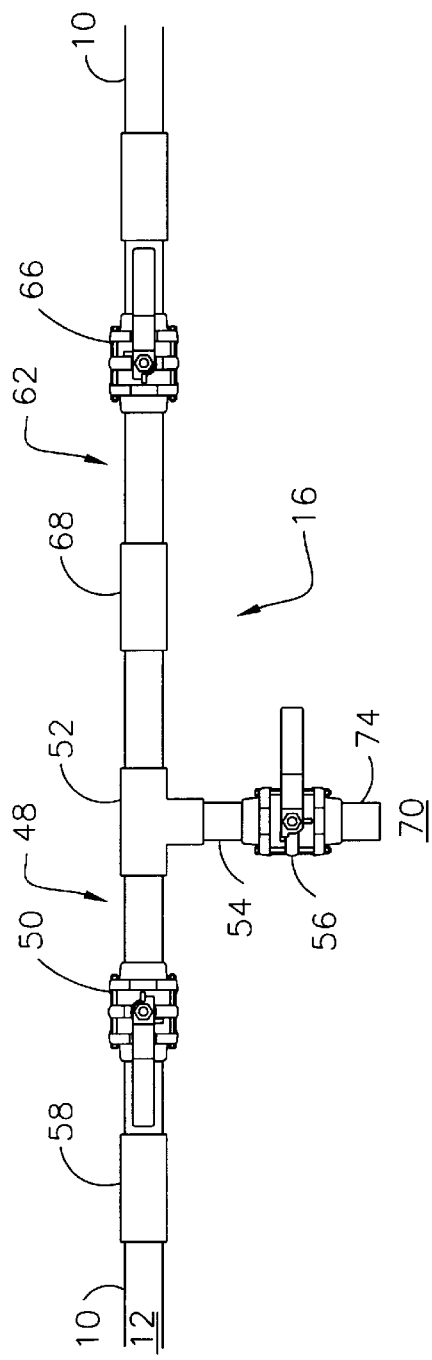

Referring now to FIG. 12, first replacement line section 48 and second replacement line section 62 are then permanently connected using third connector 68. The connections between third connector 68 and first and second replacement sections 48, 62 may be made by any method or combinations of methods which are known to those skilled in the art and which are compatible with the specifications for pipeline 10. For example, when pipeline 10 is copper, the connections may be made by soldering or brazing or by providing connector 68 as a memory-metal coupling and taking the steps necessary for making connections with memory-metal couplings or by using other suitable connecting methods known to one skilled in the art. When pipeline 10 is constructed of plastic, the connections may be made by gluing or by electrofusion or by using other suitable connecting methods known to one skilled in the art. Where appropriate in terms of materials and pipeline specifications, the connections may be made by threadably engaging the third connector 68 to at least one of the first and second replacement sections 48, 62 or through the use of compression fittings.

Finally, the first and second permanently affixed valves 50, 66 are opened to establish fluid communication between the interconnected first and second replacement sections 48, 62 and the rest of the pipeline 10.

Other embodiments of the present invention may include steps in addition to those just recited. For example, the optional additional step of purging the interconnected first and second replacement line sections 48, 62 is conducted prior to opening whichever of the first and second permanently affixed valves 50, 66, is in the downstream portion of service section 16. The purpose of the purging is to avoid contaminating the pipeline fluid 12 downstream of the service section 16 with any air or other contaminant fluid or fluidizable contaminants that may have entered the service section 16 during servicing. The purging is accomplished by first including a permanently affixed tee connector, such as tee connector 52, as part of at least one of the first and second replacement line sections 48, 62, the tee connector having a transverse leg, such as leg 54, the transverse leg having a valve, such as permanently affixed branch valve 56, and the valve having an end, such as branch valve end 74, which is in fluid communication with a reservoir. The reservoir may be the surrounding atmosphere 70 or a container or a device for receiving the purged fluid, as illustrated with reference to FIG. 12. The contaminant fluid and other fluidizable contaminants are then purged from the interconnected first and second replacement line sections 48, 62 into a reservoir by controllably opening and closing the transverse leg valve, for example branch valve 56, and whichever of the first and second permanently affixed valves 50, 66 is upstream of the branch valve 56. Opening these valves causes pipeline fluid 12 to flow through these valves and purge out the contaminants into the reservoir. The purging flow of pipeline fluid 12 is continued until the operator is satisfied that the contaminants have been sufficiently removed, either by monitoring the composition of the fluid entering the reservoir or by any other suitable means known to one skilled in the art. The branch valve 56 is then closed to conclude the purging.

Figure 14:
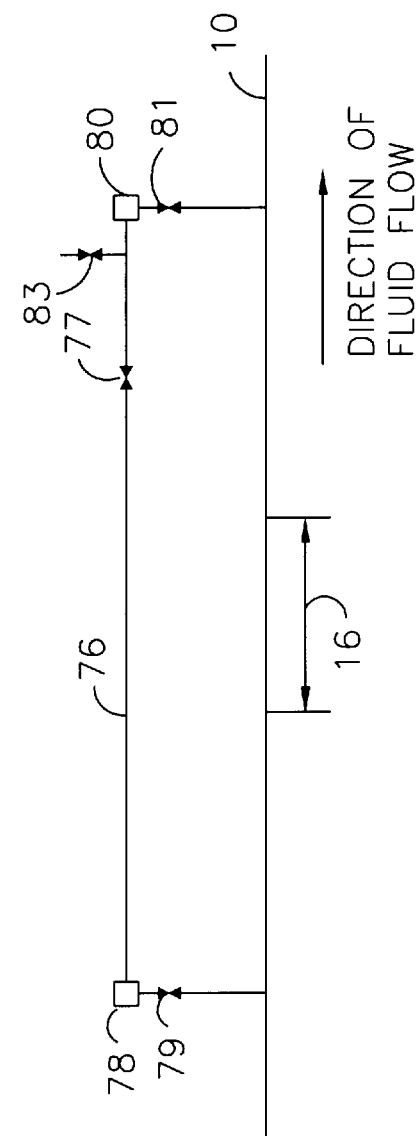
FIG. 14 is a schematic drawing showing the installation of a bypass line around the service section prior to the installation of the first and second temporary valves.

Other additional optional steps are contemplated to avoid or lessen the interruption of fluid delivery downstream of the service section 16 during the servicing of the pipeline 10. Referring now to FIG. 14, the location of a service section 16 is first identified. A bypass line 76 is then attached to a pipeline outlet 78 which is upstream of service section 16 and to pipeline outlet 80 which is downstream of service section 16. The pipeline fluid is then caused to flow from upstream outlet 78 through bypass line 76 into downstream outlet 80 either by connecting the bypass line 76 while the pipeline fluid is flowing or by opening valves which control the flow through upstream outlet 78, such as upstream outlet valve 79, or through downstream outlet 80, such as downstream outlet valve 81, or by opening a valve on the bypass line 76, such as bypass line valve 77. Preferably, after the bypass line 76 is connected to upstream outlet 78 and before fluid flow is begun into downstream outlet 80, the bypass line 76 is purged of air or other contaminant fluid or fluidizable contaminants by flowing pipeline fluid from upstream outlet 78 through the bypass line 76 and out purge valve 83.

Bypass line 76 is sized to carry the amount of fluid required to provide the desired amount of service downstream of the service section 16 while the servicing is being performed. Bypass line 76 is of a material and construction that one skilled in the art would recognize as being suitable for the temporary conductance of the pipeline fluid. The means of connecting the bypass line 76 to the upstream outlet 78 and to the downstream outlet 80 are to be by those recognized as being appropriate by those skilled in the art and are dependent on the configurations of upstream outlet 78 and downstream outlet 80.

After the flow through the bypass line 76 has begun, the pipeline 10 is then serviced by performing the steps described previously. The step of installing the first and second temporary valves 18, 20 may also be completed before the bypass line 76 is installed. The bypass line 76 may be also disconnected from upstream outlet 78 and downstream outlet 80 after the servicing has been completed.

The application of the method is not limited to use with hospital medical pipelines, though it is particularly well suited for servicing such pipelines. Though the described method may be employed with any type of pipeline, one skilled in the art will recognize that the application of any particular embodiment of the present invention must be adapted to the pressure, temperature, and composition of the fluid in the pipeline, the characteristics of the pipeline itself, including accessability, physical condition, diameter, and applicable code restrictions, and the character of the particular equipment used to employ the present invention, such as the temporary valves, the stopper rod, and the reducing gasket. In some cases, it may be necessary, prior to the employment of the disclosed method, to reduce the pressure of the fluid in the pipeline or to take other precautions that one skilled in the art would recognize as prudent depending on the nature and use of the fluid, the equipment being used, and the characteristics of the pipeline. For example, the JET SWET stopper rod identified as being suitable for use in the first embodiment is limited to uses in pipelines of diameters of about 1.2 centimeters (0.5 inch) to about 10.2 centimeters (4 inch) and pressures below about 1.7 megaPascals (250 psi), but more preferably limited to under 0.7 megaPascals (100 psi).

While only a few embodiments of the present invention have been shown and described, it will be obvious to those skilled in the art that many changes and modifications may be made thereunto without departing from the spirit and scope of the invention as described in the following claims.

What is claimed is:

1. A method for servicing a live pipeline comprising the steps of:
    a) isolating a section of the pipeline;
    b) severing the pipeline in the isolated section therein creating first and second open ends;
    c) plugging the pipeline with a first fluid-tight seal upstream of the first open end;
    d) removing a section of the pipeline between said first fluid-tight seal and the first open end;
    e) connecting a first replacement line section to the pipeline proximate to the first fluid-tight seal, said first replacement line section comprising a first valve;
    f) moving the first fluid-tight seal to a location within the first replacement line section downstream of the said first valve;
    g) closing said first valve;
    h) plugging the pipeline with a second fluid-tight seal downstream of the second open end;
    i) removing a section of the pipeline between said second fluid-tight seal and the second open end;
    j) connecting a second replacement line section to the pipeline proximate to the second fluid-tight seal, said second replacement line section comprising a second valve;
    k) moving the second fluid-tight seal to a location within the second replacement line section upstream of the said second valve;
    l) closing said second valve;
    m) interconnecting said first and second replacement line sections; and
    n) opening said first and second valves.

2. The method of claim 1 further comprising the step of removing the first fluid-tight seal prior to performing the step of interconnecting said first and second replacement line sections.

3. The method of claim 1 further comprising the step of removing the second fluid-tight seal prior to performing the step of interconnecting said first and second replacement line sections.

4. The method of claim 1 wherein either of the first or second fluid-tight seals comprises a stopper rod having a sealable end.

5. The method of claim 4, further comprising the additional step of attaching a reducing gasket to the first open end, the reducing gasket having the stopper rod removably and axially disposed therein, wherein the additional step is performed after step (b) and prior to step (c).

6. The method of claim 4, further comprising the additional step of attaching a reducing gasket to the second open end, the reducing gasket having the stopper rod removably and axially disposed therein, wherein the additional step is performed after step (g) and prior to step (h).

7. The method described in claim 1 further comprising the steps of first identifying a service section to be serviced in the pipeline, connecting a bypass line to a pipeline outlet which is upstream of the service section and to a pipeline outlet which is downstream of the service section, and causing fluid to flow from the upstream pipeline outlet through the bypass line and into the downstream pipeline outlet during the performance of steps (a) through (n).

8. The method described in claim 1, wherein the step of connecting the first replacement line section to the pipeline comprises connecting the first replacement line section to the pipeline with a memory-metal coupling.

9. The method described in claim 1, wherein the step of connecting the second replacement line section to the pipeline comprises connecting the second replacement line section to the pipeline with a memory-metal coupling.

10. The method described in claim 1, wherein the step of interconnecting the first and second replacement line sections comprises interconnecting the first and second replacement line sections with a memory-metal coupling.

11. The method described in claim 1 further comprising the step of providing a transverse leg as part of at least one of the first and second replacement line sections, the transverse leg having a valve.

12. The method described in claim 11 further comprising the step of purging fluid from the interconnected first and second replacement line sections through the transverse leg valve into a reservoir by controllably opening and closing the transverse leg valve and the first valve, wherein the step of purging is performed after step (m) and before step (n).

* * * * *